US 012479522B2

(12) United States Patent
Kusunose et al.

(10) Patent No.: US 12,479,522 B2
(45) Date of Patent: Nov. 25, 2025

(54) WORK MACHINE

(71) Applicant: Yanmar Holdings Co., Ltd., Osaka (JP)

(72) Inventors: Yoshio Kusunose, Okayama (JP); Mitsuru Kobayashi, Okayama (JP); Seungkyu Lee, Okayama (JP); Yutaka Morikawa, Osaka (JP)

(73) Assignee: YANMAR HOLDINGS CO., LTD., Osaka (JP)

(*) Notice: Subject to any disclaimer, the term of this patent is extended or adjusted under 35 U.S.C. 154(b) by 0 days.

(21) Appl. No.: 18/386,162

(22) Filed: Nov. 1, 2023

(65) Prior Publication Data
US 2024/0140542 A1    May 2, 2024

(30) Foreign Application Priority Data

Nov. 2, 2022  (JP) .................................. 2022-176345
Aug. 21, 2023 (JP) .................................. 2023-134018

(51) Int. Cl.
B62D 49/06    (2006.01)
A01D 41/127   (2006.01)
B60N 2/75     (2018.01)
B62D 1/02     (2006.01)
B62D 6/00     (2006.01)

(52) U.S. Cl.
CPC ..... *B62D 49/0692* (2013.01); *A01D 41/1278* (2013.01); *B60N 2/767* (2018.02); *B60N 2/78* (2018.02); *B62D 1/02* (2013.01); *B62D 6/00* (2013.01)

(58) Field of Classification Search
CPC .............. A01B 69/008; A01D 41/1278; B60Y 2200/22; G05D 1/0061; B60K 2360/175; B62D 6/00
See application file for complete search history.

(56) References Cited

U.S. PATENT DOCUMENTS 5,997,082 A * 12/1999 Vincent .................. B60N 3/102
                                               248/311.2
10,067,505 B2 * 9/2018 Ichikawa .............. B60W 40/00
(Continued)

FOREIGN PATENT DOCUMENTS

CN    111806319 A  * 10/2020  ............. B60N 2/753
EP    4059333 A1     9/2022
(Continued)

OTHER PUBLICATIONS

Mitsui et al., Combine Harvester, Jun. 4, 2018, EPO, KR 2018-0059567 A, Machine Translation of Description (Year: 2018).*
(Continued)

*Primary Examiner* — James A English
(74) *Attorney, Agent, or Firm* — NORTON ROSE FULBRIGHT US LLP

(57) ABSTRACT

A work machine, in which manual steering and automatic steering are switchable, includes: a manual steering device; an automatic steering device that receives a switching operation and switches the manual steering to the automatic steering; and a first operation member that receives a first operation and causes a part of the work machine to be operated. The first operation member is provided separately from the manual steering device.

18 Claims, 15 Drawing Sheets

(56) References Cited

U.S. PATENT DOCUMENTS

| | | | | |
|---|---|---|---|---|
| 2004/0099461 A1* | 5/2004 | Müller | ............ | B60K 28/04 |
| | | | | 180/272 |
| 2005/0034913 A1* | 2/2005 | Dahl | ............ | B60N 2/002 |
| | | | | 180/271 |
| 2019/0077331 A1* | 3/2019 | Tepper | ............ | A01D 67/04 |
| 2020/0180713 A1* | 6/2020 | Kosaki | ............ | G05G 1/02 |
| 2022/0104422 A1* | 4/2022 | Takase | ............ | E02F 9/2087 |
| 2022/0287218 A1* | 9/2022 | Yuasa | ............ | A01B 69/008 |

FOREIGN PATENT DOCUMENTS

| | | | |
|---|---|---|---|
| JP | 2011-139716 A | | 7/2017 |
| JP | 2017-123803 A | | 7/2017 |
| KR | 1020180059567 A | | 6/2018 |
| KR | 2021-0077386 A1 | * | 6/2021 |
| KR | 20210143481 A | * | 11/2021 |

OTHER PUBLICATIONS

Agricultural Vehicle, Nov. 29, 2021, EPO, KR 2021-0143481 A, Machine Translation of Description (Year: 2021).*
Flothmann et al., Armrest for Vehicle Seat, Oct. 23, 2020, EPO, CN 111806319 A, Machine Translation of Description (Year: 2020).*
Kim et al., Autonomous Hydraulic Steering Divice Capable of Emergency, Jun. 25, 2021, EPO, Machine Translation of Description (Year: 2021).*
Extended European Search Report dated Mar. 26, 2024, issued in EP Application No. 23204077.4.

* cited by examiner

WORK MACHINE

CROSS-REFERENCE TO RELATED APPLICATIONS

This application claims priority under 35 U.S.C. § 119 to JP Pat. App. No. 2022-176345 filed Nov. 2, 2022 and JP Pat. App. 2023-134018 filed Aug. 21, 2023, the entire contents of each of which are hereby incorporated by reference.

TECHNICAL FIELD

The present disclosure relates to a work machine such as a combine harvester or a tractor that performs agricultural work or the like, in particular to a work machine that can be switched between manual steering and automatic steering and that can be switched from automatic steering to manual steering when an excessive operation load is applied to a manual steering device.

BACKGROUND ART

In an agricultural work machine disclosed in a Patent Document 1, a changeover switch for switching between manual traveling and autonomous traveling is provided on a grip portion of a main shift lever. Furthermore, a displacement switch for displacing a set travel line in parallel during autonomous traveling is provided in the vicinity of a display panel at the back of a steering wheel.

In a combine harvester disclosed in a Patent Document 2, a lifting/lowering switch for operating to lift or lower a reaping device, which is required to be frequently operated, is provided at a position more on the right side than the center of a rotary-operation-type steering wheel for operating to change a traveling direction of a machine body.

PRIOR ART DOCUMENT

Patent Document

Patent Document 1: Japanese Patent Laid-open Publication No. 2017-123803
Patent Document 2: Japanese Patent Laid-open Publication No. 2011-139716

SUMMARY OF INVENTION

Technical Problem

When adjusting the height or the position of the work machine while performing an automatic steering, if an operation switch for the adjustment is provided on a manual steering device (such as a steering wheel), a hand is brought into touch with the manual steering device to operate a part of the work machine. At this time, there has been a problem that the automatic steering is unintentionally released and switched to the manual steering when an excessive operation load is applied to the manual steering device.

It is an object of the present disclosure to provide a work machine capable of improving operability, which is configured such that a part of the work machine can be operated while surely continuing the automatic steering, by locating an operation switch for the work machine not on a manual steering device but sideways of an automatic steering device which performs a switching operation to automatic steering.

Solution to Problem

According to an aspect of the present disclosure, a work machine is provided, in which manual steering and automatic steering are switchable, the work machine includes: a manual steering device; an automatic steering device that receives a switching operation and switches the manual steering to the automatic steering; and a first operation member that receives a first operation and causes a part of the work machine to be operated, wherein the first operation member is provided separately from the manual steering device.

Advantageous Effects of Invention

According to the present disclosure, since a part of the work machine can be operated while surely continuing the automatic steering, operability and workability can be improved.

DESCRIPTION OF EMBODIMENTS

1. Overall Configuration of Combine Harvester 1

Figure 1:
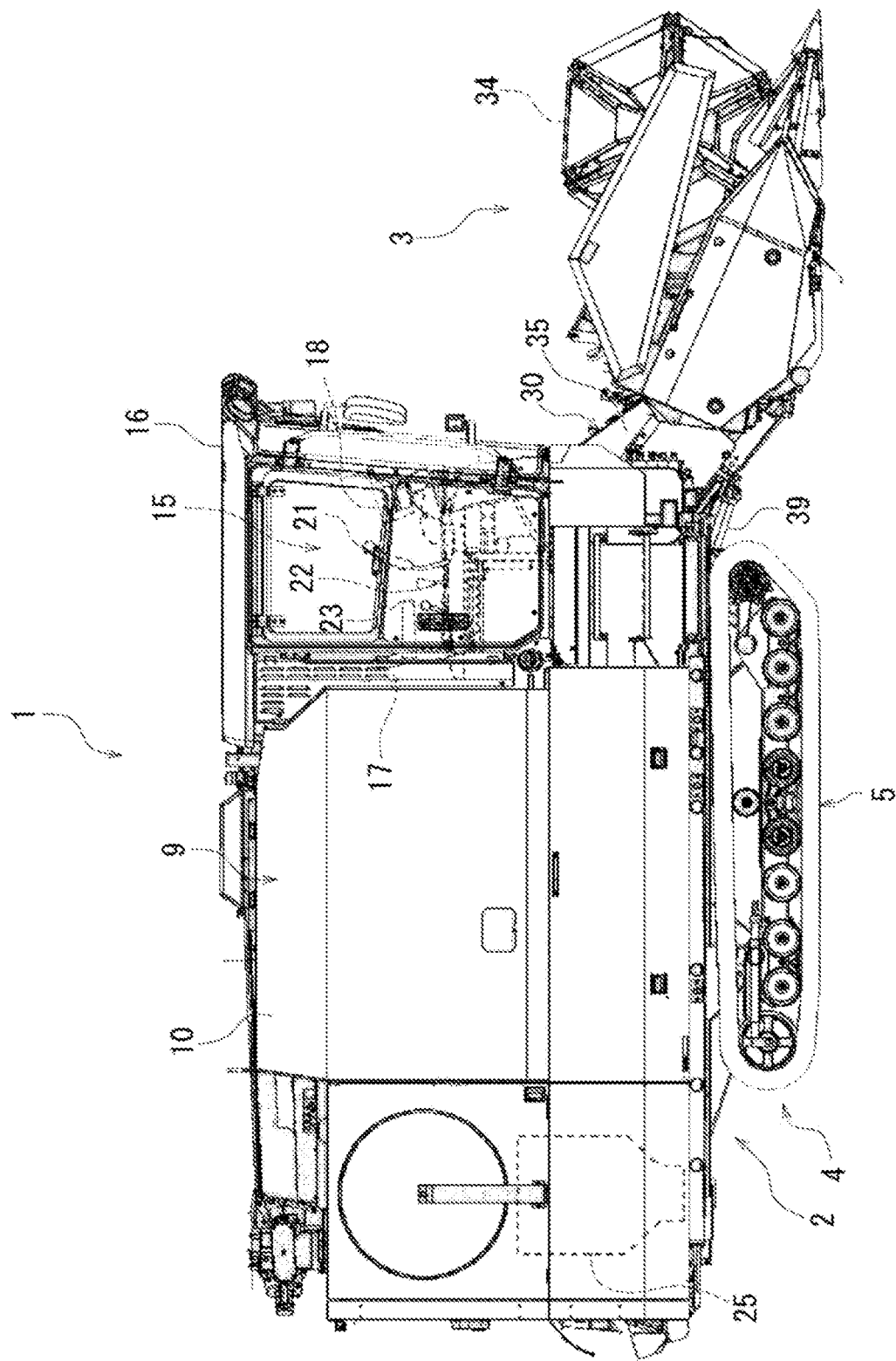
FIG. 1 is an external view illustrating a right side of a combine harvester 1 according to one embodiment of the present disclosure.
Figure 2:
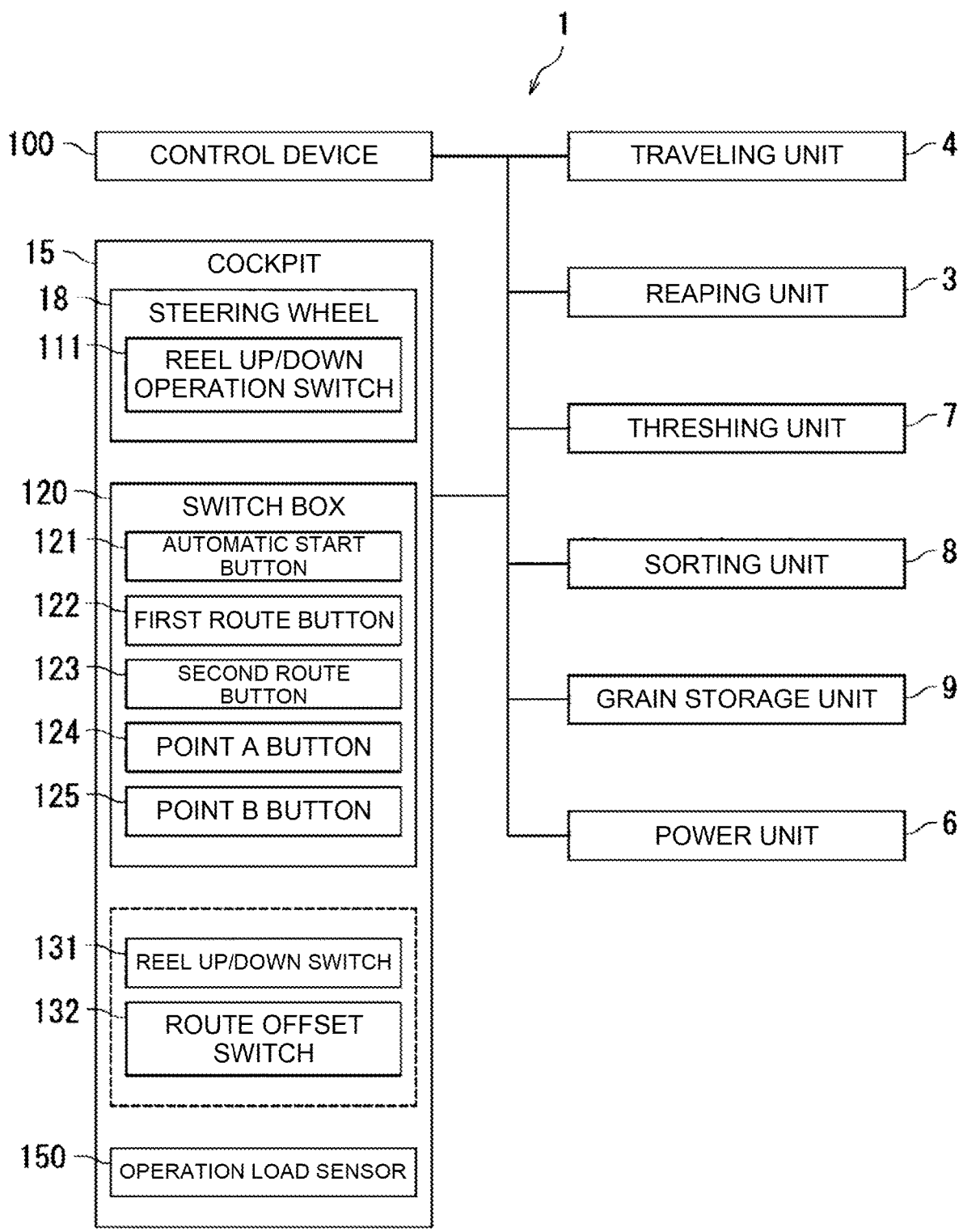
FIG. 2 is a block diagram illustrating an electrical configuration of the combine harvester 1.

FIG. 1 is an external view illustrating a right side of a combine harvester 1 according to one embodiment of the present disclosure. FIG. 2 is a block diagram illustrating an electrical configuration of the combine harvester 1. The combine harvester 1 is an example of a "work machine" of the present disclosure, but is not limited thereto. Examples of the work machine include a tractor and the like. In the following description, a traveling direction of the combine harvester 1 is defined as a front direction.

The combine harvester 1 can be switched between manual steering and automatic steering. Examples of the automatic steering include: "auto mode" for automatically performing a straight traveling, reaping lifting/lowering operation, turning, movement to a discharge position, and positioning of a middle division; "headland straight traveling mode" for performing automatic steering in parallel to each side of a field outline; and "straight traveling mode" for performing automatically straight traveling in parallel to a set reference line. At that time, automatic or manual speed control is selectable. For example, it is also possible that the first round of a field is manually reaped to register the outer shape of the field, the next two or three rounds of the field are performed in the "headland straight traveling mode" which requires no steering operation during the straight traveling, and thereafter the "auto mode" is used to fully finish the reaping work automatically. However, the automatic steering is not limited to these examples.

As shown in FIGS. 1 and 2, the combine harvester 1 is an ordinary combine harvester as a harvester capable of raking reaped field crops into a machine body, threshing, sorting, storing grains, and conveying out the grains to the outside of the machine as appropriate. The combine harvester 1 includes a traveling machine body 2 capable of autonomously traveling, a reaping unit 3 provided at a front end portion thereof, a threshing unit 7, a sorting unit 8, a grain storage unit 9 with a grain tank 10, a power unit 6, a control device 100, and a cockpit 15. The traveling machine body 2 includes a traveling unit 4 configured as a crawler-type traveling device having a crawler unit 5. Although a cockpit 15 will be described later with reference to FIGS. 3 to 6, components not related to the present disclosure are omitted from the drawings.

In front of the grain storage unit 9, a cockpit 15 on which an operator gets is provided. The cockpit 15, which is covered by a cabin 16, is provided with a seat 17, a handle (steering wheel) 18 disposed in front of the seat 17, a main shift lever 21, a sub-shift lever 22, a work clutch lever 23, and the like. The main shift lever 21, the sub-shift lever 22, and the work clutch lever 23 are provided on a side panel 24 disposed on the left side of the seat 17.

An engine 25 as a drive source is provided in the rear of the grain storage unit 9. The power unit 6 with the engine 25 transmits rotational power to the traveling unit 4, the reaping unit 3, the threshing unit 7, the sorting unit 8, the grain storage unit 9, and the like. Examples of the engine 25 include, but are not limited to, a diesel engine.

The reaping unit 3 has a feeder 30 as a conveying device and a rake-in reel 34. The reaping unit 3 is attached so that it can be lifted and lowered between a lowered position in which reaping of the grain culms in the field is enabled, and a lifted position in which reaping of the grain culms is disabled.

The feeder 30 is a conveying device that conveys grain culms reaped by the reaping unit 3 and supplies the grain culms to the threshing unit 7. The feeder 30 has a feeder house 35 as a housing and is positioned on the left side of the cabin 16.

A cylinder(s) for lifting/lowering 39 is interposed below the feeder house 35. The cylinder for lifting/lowering 39 is a single-acting hydraulic cylinder which is hydraulically actuated during its extension. Therefore, the reaping unit 3 (feeder 30) is pivoted in the lifting direction by extension of the cylinder for lifting/lowering 39 actuated hydraulically, and the cylinder for lifting/lowering 39 is contracted along with lowering of the reaping unit 3 (feeder 30) due to its own weight by release of the hydraulic pressure of the cylinder for lifting/lowering 39.

The feeder 30 constitutes a reaping unit 3 together with the rake-in reel 34 and the like, and the reaping unit 3 is configured to perform the lifting/lowering operation by the pivoting of the feeder 30 with respect to the traveling machine body 2 by an extension/contraction operation of the cylinder for lifting/lowering 39. Furthermore, the rake-in reel 34 can also be lifted and lowered, and the lifting and lowering operation thereof is manipulated by, for example, a reel up/down switch 131 or a reel up/down operation switch 111 provided on the cockpit 15. Note that the reel up/down switch 131 and the reel up/down operation switch 111 will be described later with reference to FIGS. 3 to 5.

2. Cockpit 15

Figure 3:
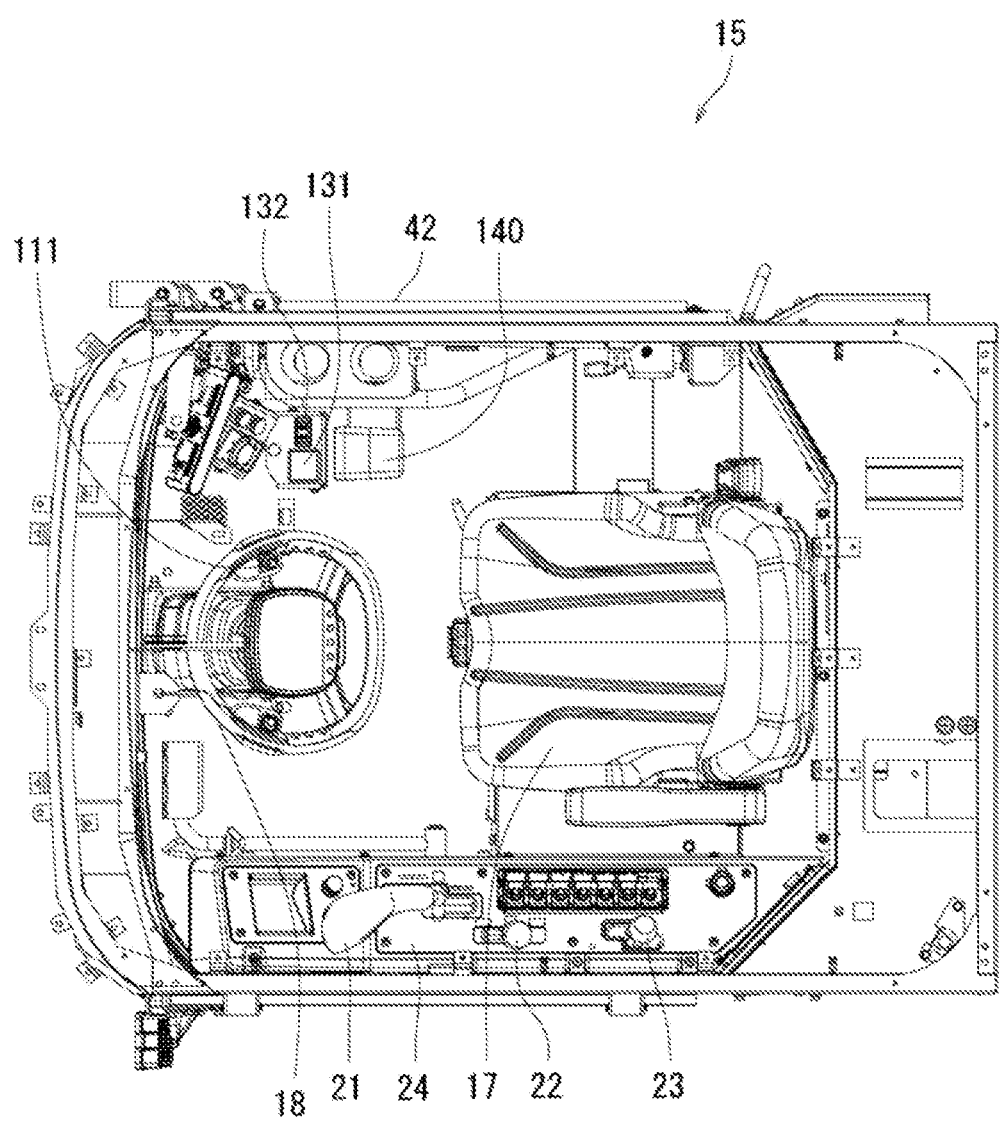
FIG. 3 is a plan view illustrating the inside of a cockpit 15 of the combine harvester 1.
Figure 4:
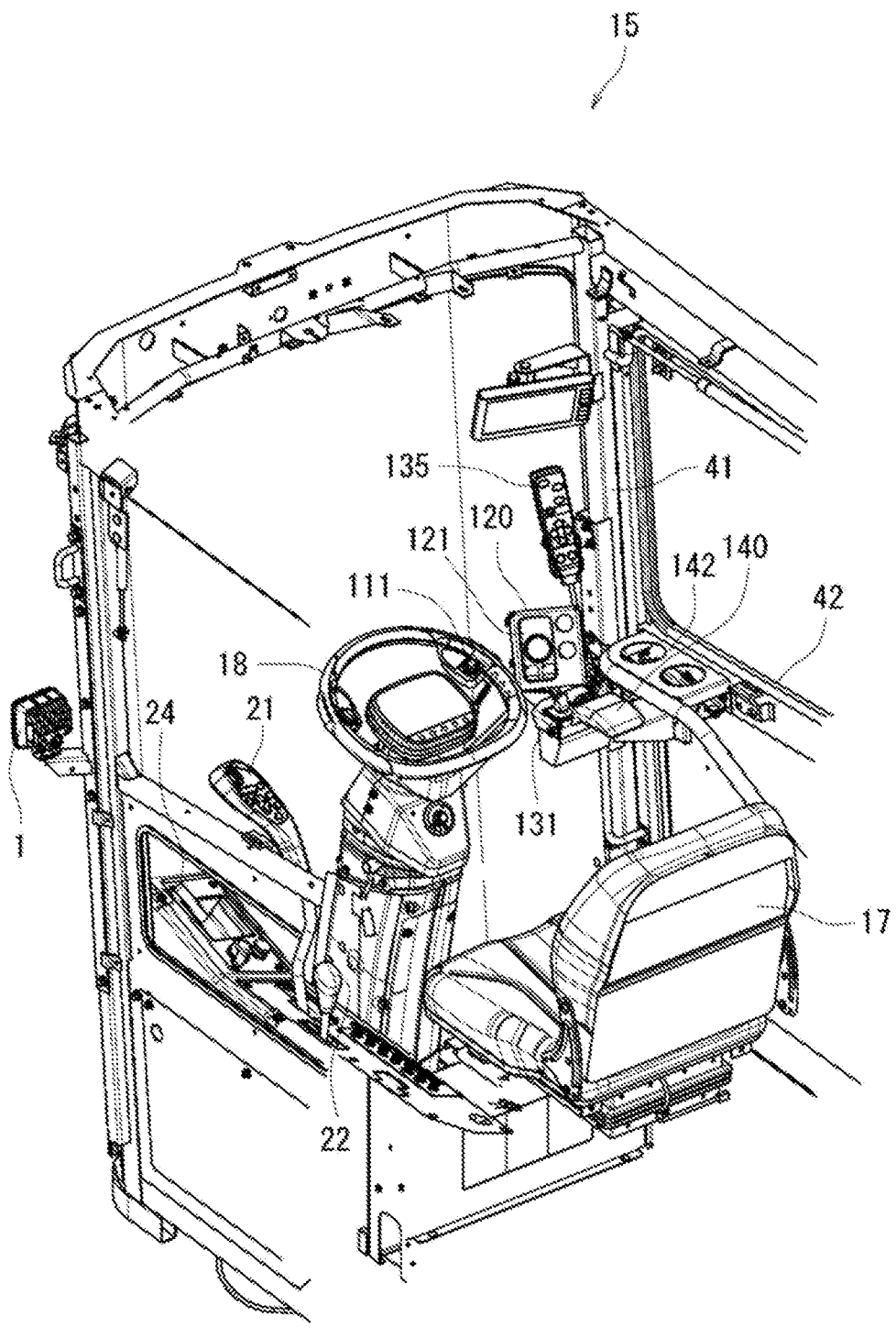
FIG. 4 is a perspective view illustrating the inside of the cockpit 15.
Figure 5:
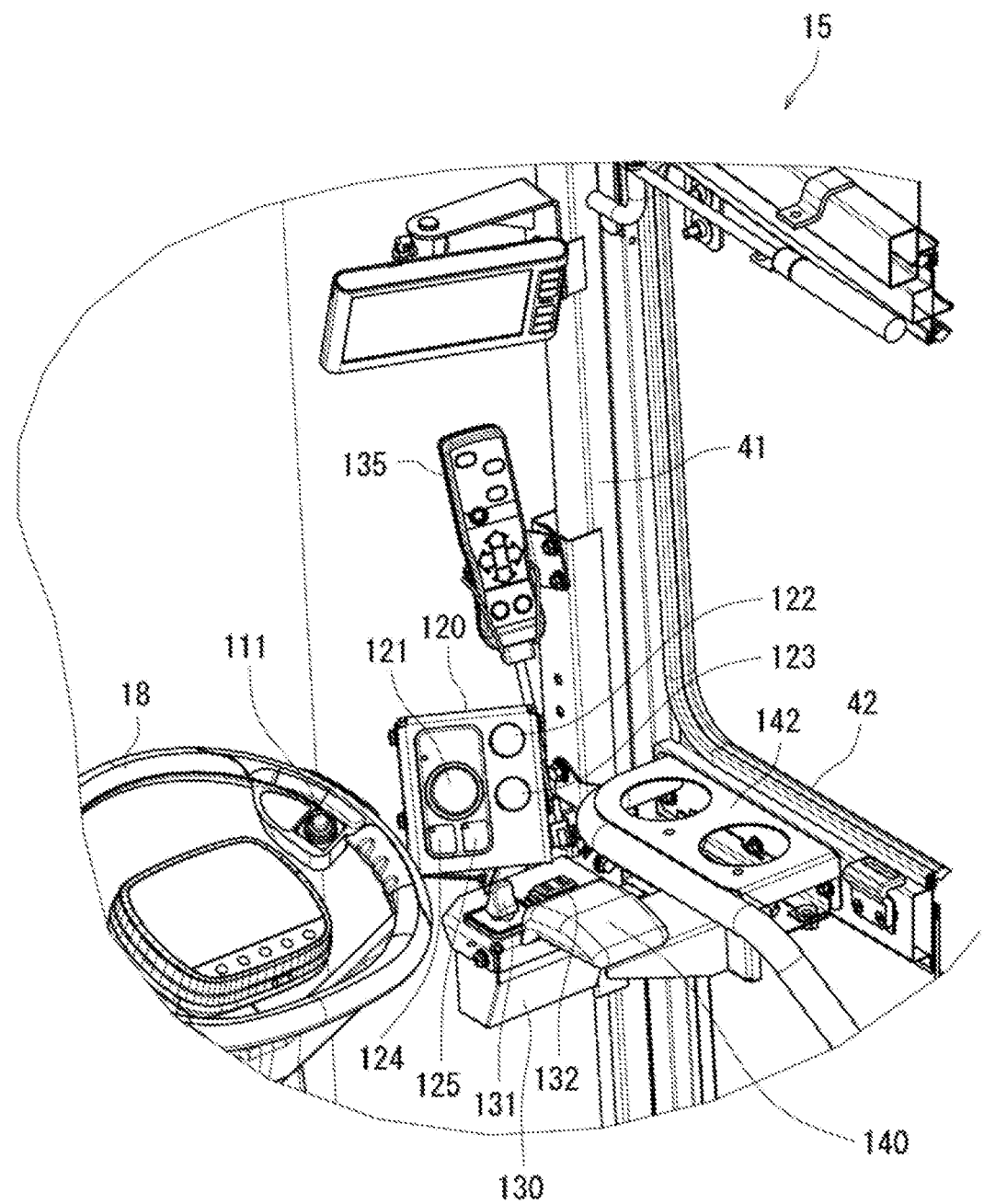
FIG. 5 is an enlarged perspective view illustrating a main part of the inside of the cockpit 15 as viewed from the upper left rear side.
Figure 6:
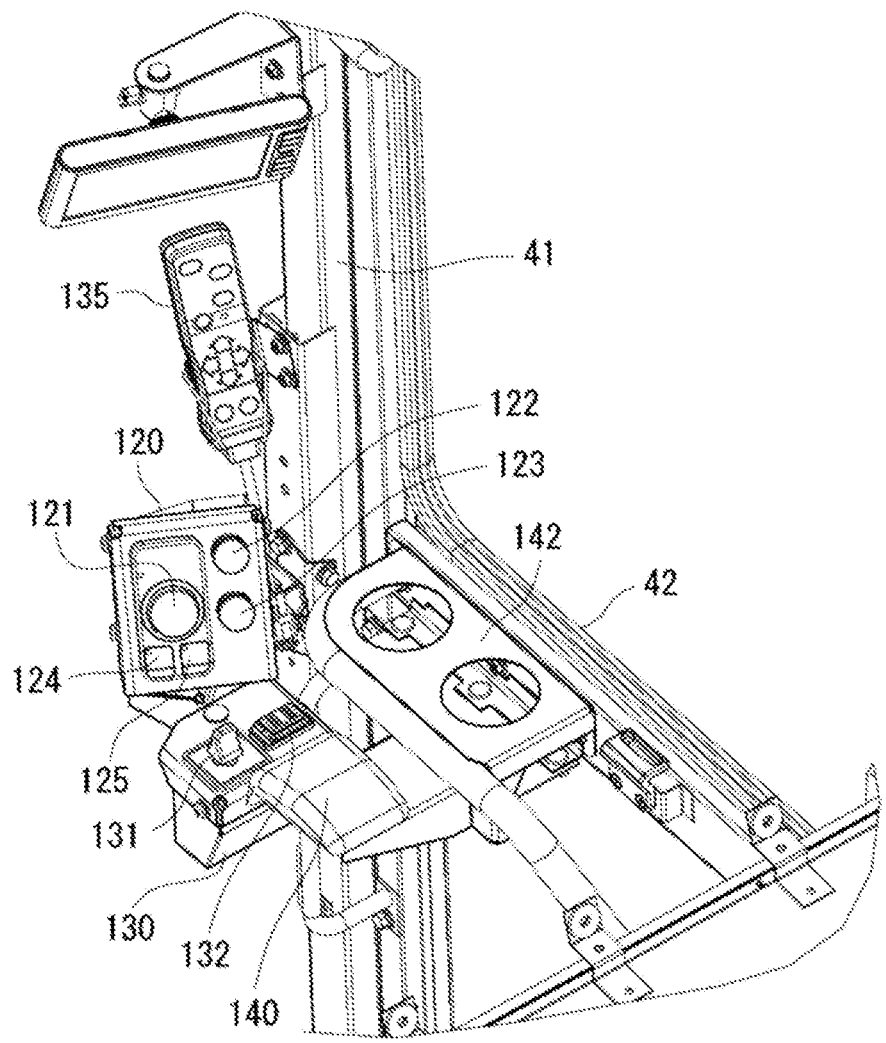
FIG. 6 is an enlarged perspective view illustrating a main part of the inside of the cockpit 15 as viewed from slightly more upper side than FIG. 5.
Figure 7:
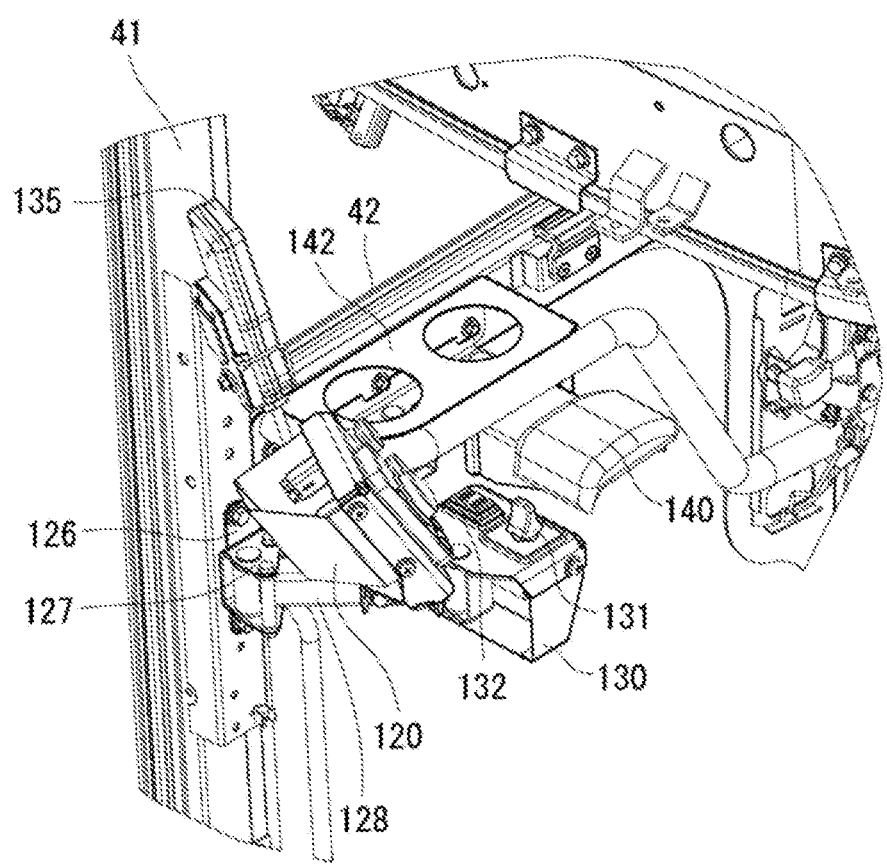
FIG. 7 is an enlarged perspective view illustrating a main part of the inside of the cockpit 15 as viewed from the upper left front side.
Figure 8:
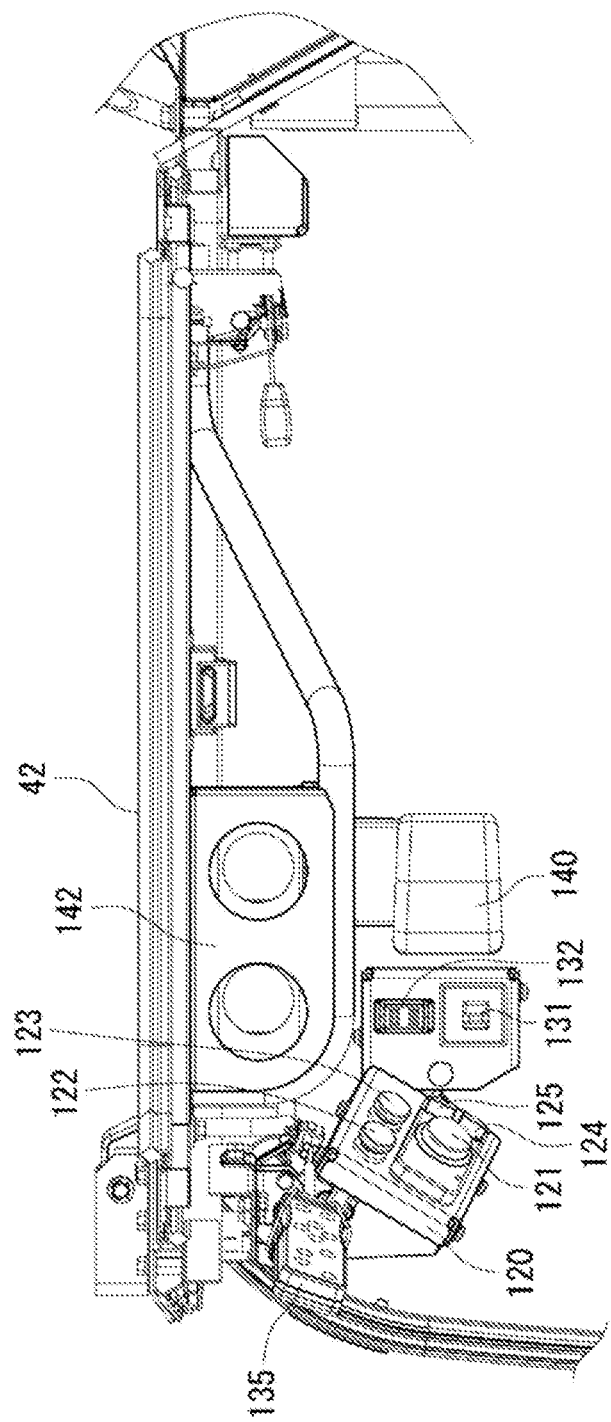
FIG. 8 is an enlarged plan view illustrating a main part of the inside of the cockpit 15.
Figure 9:
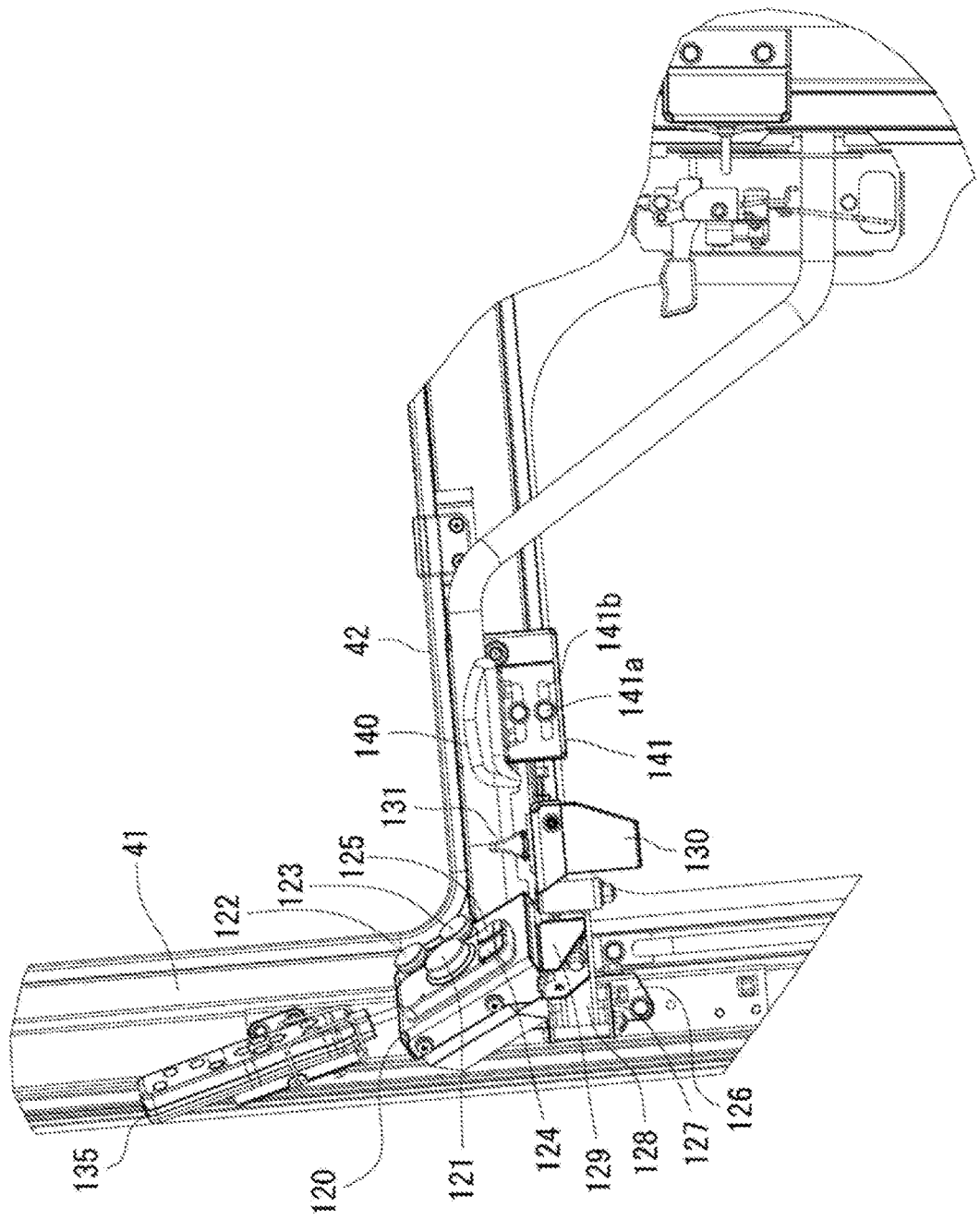
FIG. 9 is an enlarged left side view illustrating a main part of the inside of the cockpit 15.
Figure 10:
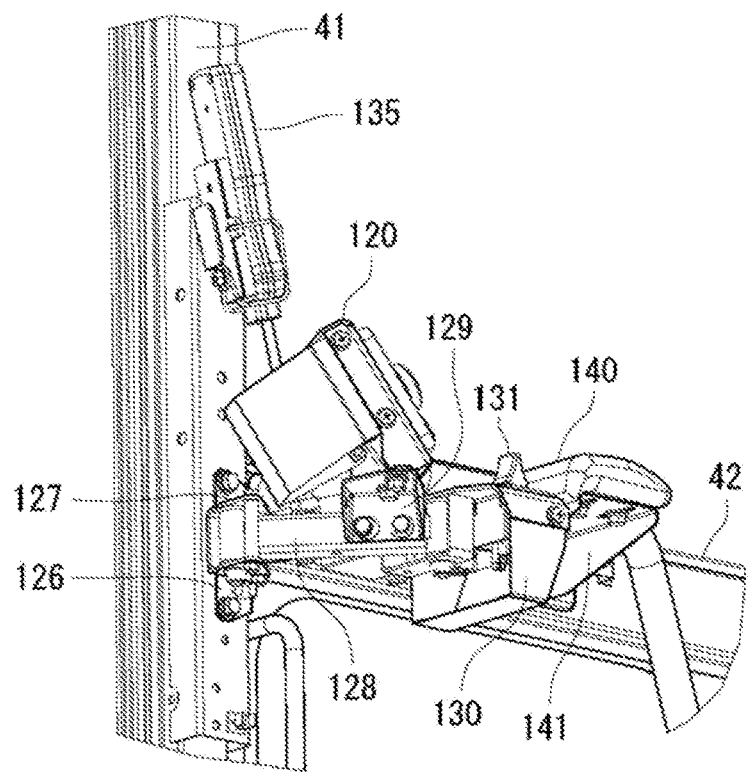
FIG. 10 is an enlarged perspective view illustrating a main part of the inside of the cockpit 15 as viewed from the lower left front side.
Figure 11:
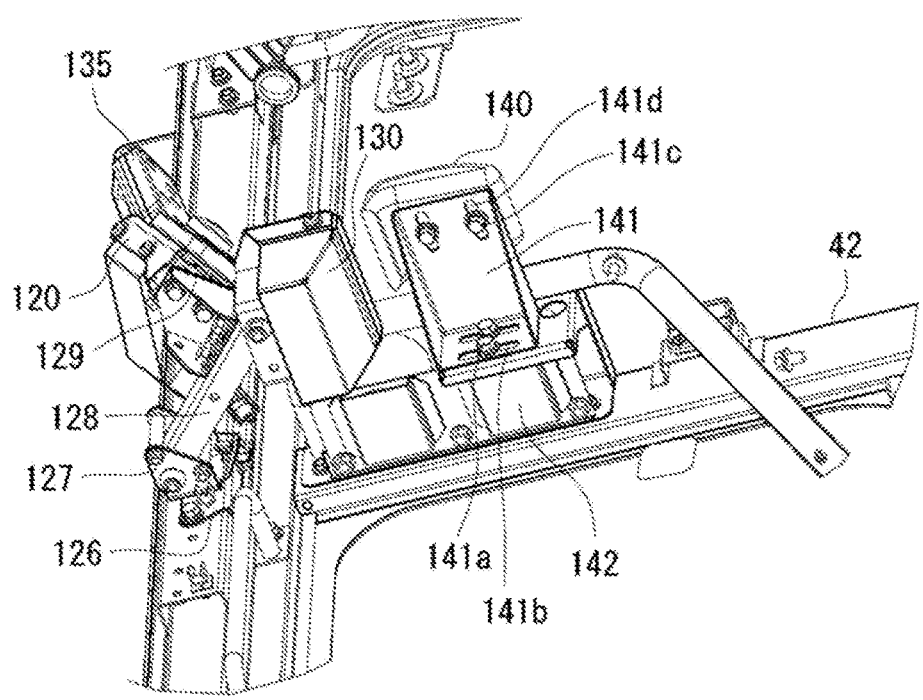
FIG. 11 is an enlarged perspective view illustrating a main part of the inside of the cockpit 15 as viewed from the lower left side.
Figure 12:
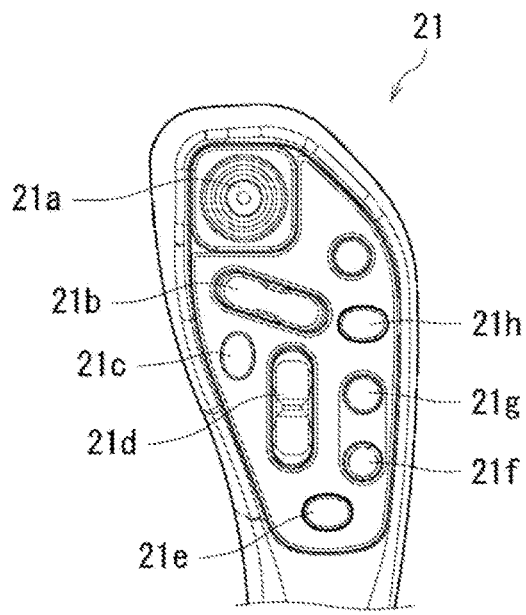
FIG. 12 is an enlarged view illustrating a main shift lever 21.
Figure 13:
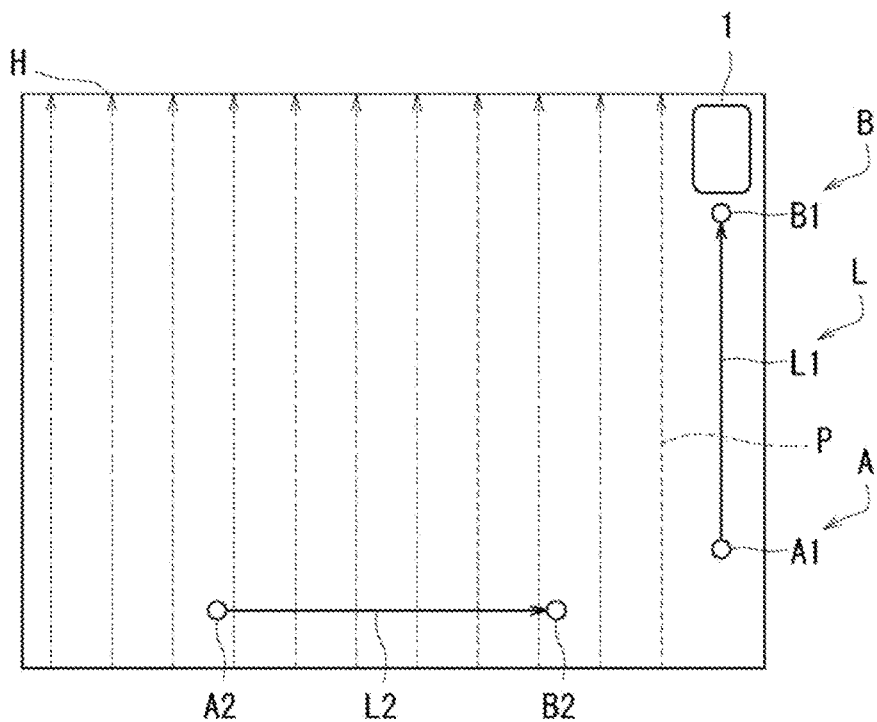
FIG. 13 is a plan view illustrating an autonomous travel route P in a field H.

FIG. 3 is a plan view illustrating the inside of the cockpit 15 of the combine harvester 1. FIG. 4 is a perspective view of the inside of the cockpit 15. FIG. 5 is an enlarged perspective view illustrating a main part of the inside of the cockpit 15 as viewed from the upper left rear side. FIG. 6 is an enlarged perspective view illustrating the main part thereof as viewed from slightly more upper side than FIG. 5. FIG. 7 is an enlarged perspective view illustrating the main part thereof as viewed from the upper left front side. FIG. 8 is an enlarged plan view illustrating the main part thereof. FIG. 9 is an enlarged left side view illustrating the main part thereof. FIG. 10 is an enlarged perspective view illustrating the main part thereof as viewed from the lower left front side. FIG. 11 is an enlarged perspective view illustrating the main part thereof as viewed from the lower left side. FIG. 12 is an enlarged view of a main shift lever 21. FIG. 13 is a plan view illustrating an autonomous travel route P in a field H.

As shown in FIGS. 3 to 12, the combine harvester 1 is provided with a seat 17 substantially at the center of the inside of the cockpit 15 and a substantially circular shaped steering wheel 18 for manual steering in front of the seat 17. The steering wheel 18 corresponds to a "manual steering device" of the present disclosure.

The reel up/down operation switch 111 is disposed at a circumferentially inner side and slightly upper right side of the steering wheel 18. The reel up/down operation switch 111 can be manipulated to back and forth and right and left by a fingertip while gripping the steering wheel 18. The reel up/down operation switch 111 is manipulated to operate a part of the combine harvester 1, specifically the rake-in reel 34, similarly to a reel up/down switch 131 described later. For example, the lifting/lowering operation may be performed by the back and forth operation, and the rotation speed may be adjusted by the right and left operation. Alternatively, functions different from those of the reel up/down switch 131 may be assigned. Furthermore, it may be configured so that operations other than those of the rake-in reel 34 can be performed.

As shown in FIGS. 5 to 11, the cockpit 15 further includes a switch box 120 in which an operation system for automatic steering is arranged, a reel up/down switch 131, a route offset switch 132, and an armrest 140. The switch box 120 is attached so as to be supported by a right front pillar 41 via members 126 to 129. The reel up/down switch 131 and the route offset switch 132 are attached to an inner side of a right door 42, which can open and close, via a member 130 and a drink holder 142.

The switch box 120 has a slightly longitudinal box shape, and the length in the longitudinal direction is the extent of the radius of the steering wheel 18. The switch box 120 is disposed at a position slightly below an obliquely right front side near the steering wheel 18 and slightly away from the steering wheel 18 so as to be inclined such that the front surface thereof faces a face of the operator sitting on the seat 17.

A relatively large circular automatic start button 121 is disposed at a position substantially center of the left side of the front surface of the switch box 120, and when the automatic start button 121 is pressed and turned on, the manual steering is switched to the automatic steering. The automatic start button 121 or the switch box 120 including the same corresponds to an "automatic steering device" of the present disclosure. The operation of pressing the automatic start button 121 to turn on is an example of a "switching operation" of the present disclosure.

Note that as shown in FIG. 12, the main shift lever 21 mounted on the side panel 24 is provided with a reel back and forth/reel shift switch 21a, an operation switch 21b for horizontal control of the reaping unit 3, a straight travel assist ON/OFF switch 21c, a reaping lifting/lowering switch 21d, a no-clutch sub-shift switch 21e, an auto-set switch 21f, an auto-lift switch 21g, and a reaping clutch switch 21h. Among these switches, the straight travel assist ON/OFF switch 21c has the same function as the automatic start button 121.

As shown in FIGS. 5, 6, 8, and 9, the switch box 120 further includes a first route button 122 and a second route button 123 for registering a first route and a second route of the automatic steering, respectively, and a point A button 124 and a point B button 125 for setting a start point (point A) and an end point (point B), respectively.

As shown in FIG. 13, the combine harvester 1 is configured to be able to set a plurality of reference lines L for the field H, and may set a start point A and an end point B in the field H for each of the reference lines L to create the reference line L from the start point A to the end point B. In the present embodiment, a first reference line L1 and a second reference line L2 can be set as the plurality of reference lines L. The first reference line L1 is created by connecting the first start point A1 to the first end point B1 with a straight line, and the second reference line L2 is created by connecting the second start point A2 to the second end point B2 with a straight line. In FIG. 13, an autonomous travel route P created based on the first reference line L1 is shown, and the combine harvester 1 performs an autonomous straight traveling along the autonomous travel route P.

The reel up/down switch 131 is manipulated to operate a part of the combine harvester 1, for example, to adjust the height or position of the combine harvester 1 or to lift or lower the reel. For example, lifting/lowering operation of the reaping unit 3 may be possible. Specifically, it may be configured so that the reaping unit 3 can be lowered when the reel up/down switch 131 is tilted forward, and the reaping unit 3 can be lifted when the reel up/down switch is tilted backward. However, a subject to be operated (a part of the combine harvester 1) and an operation method are not limited to these examples. As shown in FIG. 5, the reel up/down switch 131 is disposed at a position slightly below the right near side of the steering wheel 18, slightly away from the steering wheel 18, and on the side of the switch box 120 (slightly away from the switch box 120 and in the vicinity of the lower end portion thereof). The reel up/down switch 131 corresponds to a "first operation member" of the present disclosure. The operation of tilting the reel up/down switch 131 forward or backward is an example of a "first operation" of the present disclosure.

The route offset switch 132 is disposed at a position immediately right side of the reel up/down switch 131, and is operated to adjust the left/right offset of the route by the automatic steering. For example, it may be configured so that the offset in the right direction can be added by a predetermined amount (for example, several cm) for every time when the route offset switch is tilted to the right side, and the offset in the left direction can be added by the same predetermined amount for every time when the route offset switch is tilted to the left side.

As shown in FIGS. 5 to 9, the armrest 140 is a table-like member whose top surface is slightly curved so that the arm of the operator can be placed thereon, and is disposed at a position slightly higher than the reel up/down switch 131 and obliquely right rear side of the steering wheel 18. That is, as can be seen from FIGS. 3 and 8, it can also be said that the reel up/down switch 131 is disposed between the automatic start button 121 and the armrest 140 in a plan view. As shown in FIG. 11, the armrest 140 is attached to the inner side of the right door 42, which can open and close, via an attachment member 141 and the drink holder 142.

Furthermore, as shown in FIG. 9, the reel up/down switch 131 is disposed at a position slightly lower than the front end of the armrest 140 so that it can be operated by a fingertip with the right arm placed on the armrest 140. As shown in FIGS. 9 and 11, in order to perform such an operation with very little burden on the right arm, the armrest 140 is configured to be position-adjustable (closer to or away from) in the front-rear direction with respect to the reel up/down switch 131 by a long groove 141b and a bolt 141a provided in the attachment member 141. Furthermore, as shown in FIG. 11, the armrest 140 is configured to be position-adjustable in the left-right direction with respect to the reel up/down switch 131 by the long groove 141d and the bolt 141c provided in the attachment member 141.

The combine harvester 1 further includes an operation load sensor 150 (see FIG. 2) for detecting an operation load applied to the steering wheel 18. When an excessive operation load (not less than a predetermined value) is applied to the steering wheel 18 during the automatic steering, the automatic steering is released and switched to the manual steering. This allows the automatic steering to be released by a natural operation to steer the steering wheel 18 without performing a special operation when the automatic steering is desired to be released, and this allows the automatic steering to be shifted to the driving by the manual steering smoothly. For example, by configuring it to detect not only the operation load but also the steering angle, the automatic steering may be released when the steering angle becomes not less than a preset steering angle. The operation load sensor 150 corresponds to a "detection unit" according to the present disclosure.

3. Another Embodiment

Figure 14:
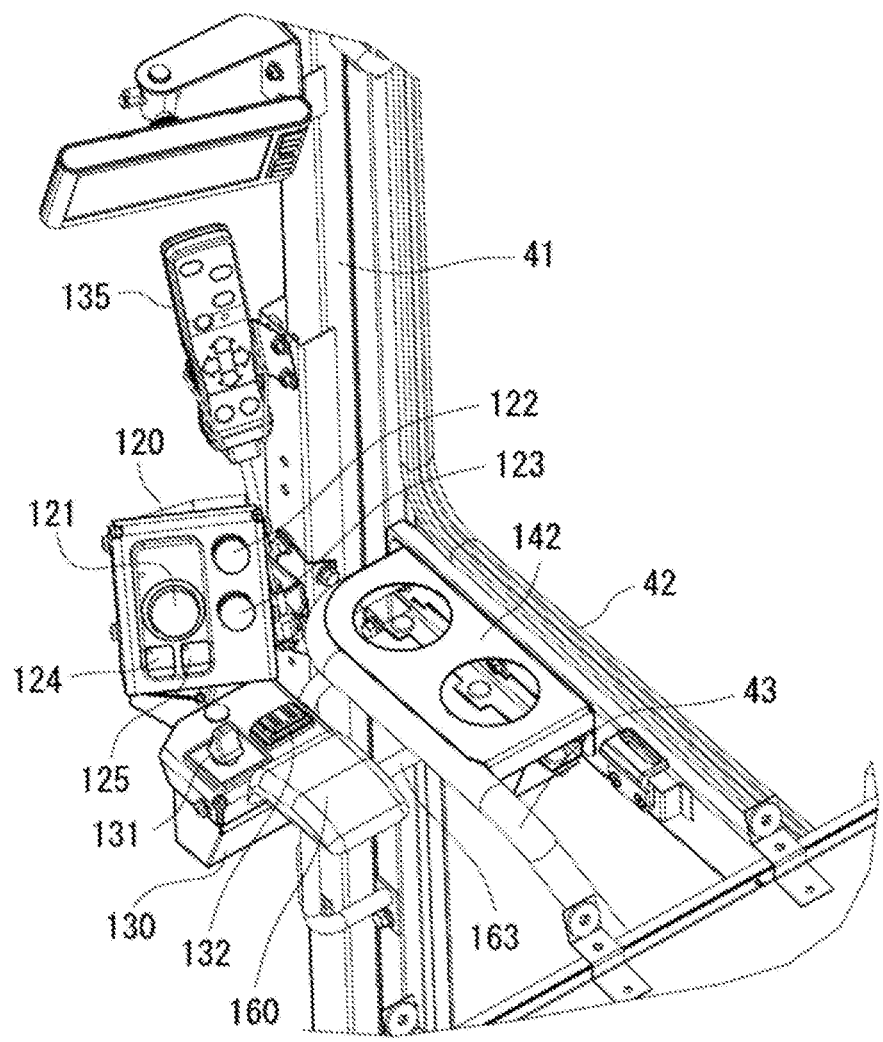
FIG. 14 is an enlarged perspective view illustrating a main part of the inside of the cockpit 15 of the combine harvester 1 according to another embodiment as viewed from the upper left rear side.

Next, the combine harvester 1 according to another embodiment of the present disclosure will be described. In the following description, the same components as those of the embodiment mentioned above are denoted by the same reference numerals, and the description thereof will be omitted. FIG. 14 is an enlarged perspective view illustrating a main part of the inside of the cockpit 15 of the combine harvester 1 according to another embodiment as viewed from the upper left rear side.

The combine harvester 1 is provided with a handle 43. The handle 43 is attached to the inner side of the right door 42 and extends along the front-rear direction. The drink holder 142 is connected to the handle 43. The drink holder 142 is disposed between the handle 43 and the right door 42. The drink holder 142 is fixed to the handle 43 and the right door 42. An armrest 160 is connected to the drink holder 142 via a handle 43.

Figure 15:
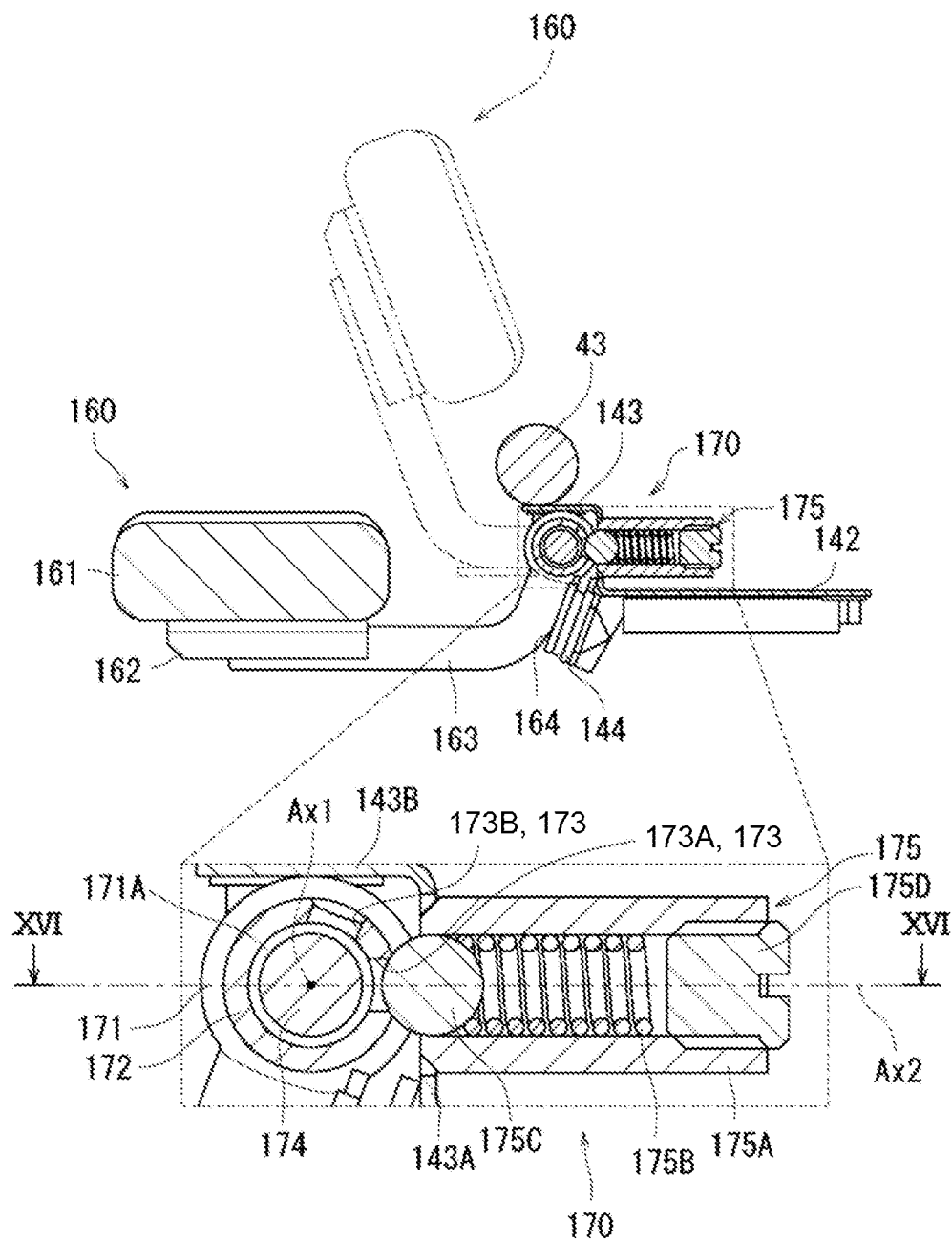
FIG. 15 is a rear view illustrating a support structure of the armrest 160.

FIG. 15 is a rear view illustrating a support structure of the armrest 160. In the drawing, a structure of a portion surrounded by a broken line is mainly shown in a cross-sectional view for the convenience of explanation. Furthermore, for the convenience of explanation, the upper side of the drink holder 142 is omitted in the drawing.

As shown in FIG. 15, a fixing plate 143 is connected to the drink holder 142.

The fixing plate 143 is integrally formed with the drink holder 142. The fixing plate 143 includes a first fixing piece 143A and a second fixing piece 143B. The first fixing piece 143A is a plate member extending upward from an end portion on one side (left side) of the drink holder 142. The second fixing piece 143B is a plate member extending to the left side from an upper end portion of the first fixing piece 143A. The second fixing piece 143B of the fixing plate 143 is fixed to the bottom of the handle 43.

A pedestal 144 is attached to a left end portion of the drink holder 142. The pedestal 144 is attached to the left end surface of the drink holder 142 in an inclined manner such that a surface thereof faces the upper left direction.

The armrest 160 is attached to the handle 43 via a support member 170. The armrest 160 is supported by the support member 170 in a manner pivotable about a pivot axis Ax1 in the circumferential direction.

The armrest 160 includes a mat portion 161, a fixing portion 162, and an arm portion 163. The mat portion 161 is made of a soft material such as urethane. The mat portion 161 has a substantially rectangular shape in a plan view. The armrest 160 is used by resting the right palm of the operator on a top surface of the mat portion 161. The fixing portion 162 is connected to the bottom surface of the mat portion 161.

The fixing portion 162 fixes the mat portion 161 to the arm portion 163. The fixing portion 162 is made of a metal material. The fixing portion 162 forms a metal plate having a rectangular shape in a plan view. The fixing portion 162 is fixed to the bottom surface of the mat portion 161 via bolts. The tip of the arm portion 163 is connected to the fixing portion 162.

The arm portion 163 is a pipe member extending in one direction. An end portion on one side (left side) of the arm portion 163 is connected to the fixing portion 162. A movable cylinder 172 of the support member 170, which will be described later, is connected to an end portion on the other side (right side) of the arm portion 163. In a state where the armrest 160 is used (the state shown by the solid line in FIG. 15), the arm portion 163 extends in the left-right direction and is curved at the end portion on the right side. A right end portion of the arm portion 163 extends so that the upward inclination thereof is gradually increased toward the right side. Therefore, the arm portion 163 has a substantially L shape in a front view. A plate-shaped abutting plate 164 is attached to a right end portion of the arm portion 163. The abutting plate 164 abuts on the surface of the pedestal 144. This allows the pedestal 144 to support the load burdened on the arm portion 163 when the operator places the palm on the mat portion 161 of the armrest 160.

The support member 170 is a member that supports the armrest 160 in a position-adjustable manner. The support member 170 includes the pivot axis Ax1 extending in the front-rear direction. The armrest 160 is supported by the support member 170 in a manner pivotable about the pivot axis Ax1. In the following description, a direction along the pivot axis Ax1 of a connection cylinder 171 is defined as an axial direction. In addition, a direction pivoting about the pivot axis Ax1 is defined as a circumferential direction. A direction orthogonal to the pivot axis Ax1 is defined as a radial direction.

The support member 170 includes the connection cylinder 171, the movable cylinder 172, a fixed shaft 174, and a plunger 175. The connection cylinder 171 is fixed to the bottom surface of the second fixing piece 143B of the fixing plate 143.

Figure 16:
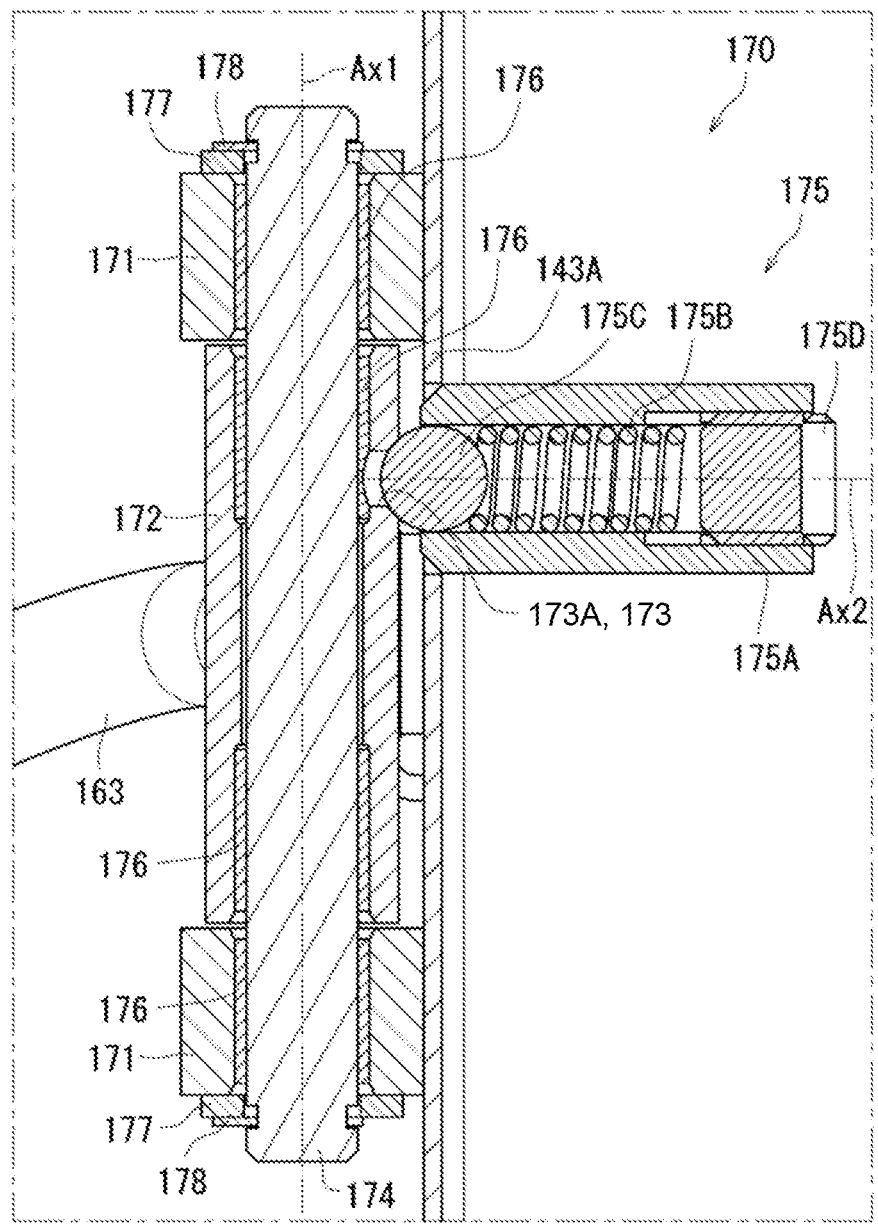
FIG. 16 is a cross-sectional view taken along a line XVI-XVI shown in FIG. 15.

FIG. 16 is a cross-sectional view taken along a line XVI-XVI shown in FIG. 15. As shown in FIG. 16, two connection cylinders 171 are disposed at some interval apart in the axial direction. A cylindrical collar 176 is inserted into the connection cylinder 171. Two connection cylinders 171 are disposed coaxially.

The movable cylinder 172 has a cylindrical shape whose outer diameter and inner diameter are uniform over the entire region in the axial direction. Both ends of the movable cylinder 172 in the axial direction are open. The collars 176 are each inserted from both ends of the movable cylinder 172 into the inside thereof in the axial direction. Both ends of the movable cylinder 172 in the axial direction face end surfaces of the connection cylinders 171 in the axial direction. Therefore, displacement of the movable cylinder 172 in the axial direction is restricted. On the other hand, the movable cylinder 172 is held by the connection cylinder 171 in a displaceable (pivotable) manner in the circumferential direction.

A cutout portion 173 is formed in the circumferential wall of the movable cylinder 172 so as to penetrate it in the radial direction. A chamfered portion (tapered surface) is formed at a radially outer end portion of the cutout portion 173. Since the chamfered portion is formed, a ball 175C of the plunger 175 which will be described later can smoothly enter into the inside of the cutout portion 173 or be smoothly released from the inside thereof. A plurality of cutout portions 173 are formed in the circumferential wall of the movable cylinder 172. The positions of the plurality of cutout portions 173 in the axial direction coincide with each other.

As shown in FIG. 15, the cutout portion 173 has a first cutout portion 173A and a second cutout portion 173B. The first cutout portion 173A and the second cutout portion 173B are arranged at some interval apart in the circumferential direction in the circumferential wall of the movable cylinder 172. A movable range of the armrest 160 in the circumferential direction is determined by positions of the first cutout portion 173A and the second cutout portion 173B.

In the present embodiment, a positional relationship between the first cutout portion 173A and the second cutout portion 173B is such that a central angle around the pivot axis Ax1 is 70 degrees. The central angle between the first cutout portion 173A and the second cutout portion 173B is preferably greater than 45 degrees. The movable cylinder 172 may have three or more cutout portions 173. In addition, the positional relationship between the plurality of cutout portions 173 can be arbitrarily changed.

The fixed shaft 174 is a shaft member extending in the axial direction. The fixed shaft 174 is inserted into the inside of the two connection cylinders 171 and the movable cylinder 172 via collars 176. The fixed shaft 174 makes it possible to fix the positions of the connection cylinders 171 and the movable cylinder 172. The fixed shaft 174 is disposed coaxially with the pivot axis Ax1. Washers 177, which are stoppers that restrict displacement of the connection cylinders 171 in the axial direction, are each attached to end portions of the fixed shaft 174 in the axial direction. The positions of the washers 177 in the axial direction are restricted by C-shaped stopper rings 178 each attached to the outside of the washers in the axial direction.

The plunger 175 is a member to regulate the position of the armrest 160 in the circumferential direction. The plunger 175 cooperates with the cutout portions 173 formed in the movable cylinder 172 to constitute a detent mechanism. The detent mechanism indicates a mechanism to hold a stopper member at a predetermined position by resistance of a spring or the like. That is, the plunger 175 and the movable cylinder 172 function as a retainer that retains the armrest 160 at the ends of the movable range within which the armrest 160 pivots. In this way, the retainer retains the position of the armrest 160 in the circumferential direction around the pivot axis Ax1.

The plunger 175 includes a housing cylinder 175A, a spring 175B, a ball 175C, and a setscrew 175D.

The housing cylinder 175A has a cylindrical shape whose central axis Ax2 extends in the radial direction (left-right direction). An end surface on one side (left side) of the housing cylinder 175A in the radial direction is connected to the first fixing piece 143A of the fixing plate 143. The housing cylinder 175A is disposed such that the central axis Ax2 is located on one side of the movable cylinder 172 in the axial direction with respect to the center thereof in the axial direction.

The spring 175B is a coil spring extending in the radial direction (left-right direction). The spring 175B is housed in the housing cylinder 175A. The spring 175B is disposed coaxially with the central axis Ax2.

The ball 175C is housed in the housing cylinder 175A. The ball 175C is disposed in the housing cylinder 175A in a manner movable in the radial direction. The ball 175C is a stopper member of the movable cylinder 172.

The ball 175C is disposed at an end portion on one side (left side) in the radial direction inside the housing cylinder 175A. The ball 175C abuts on an end portion of the spring 175B, and is biased by the spring 175B toward the outer side (left side) of the housing cylinder 175A in the radial direction. A left end portion of the ball 175C is inserted into the cutout portion 173 of the movable cylinder 172.

The setscrew 175D is attached to an end portion on the other side (right side) of the housing cylinder 175A in the radial direction. A male screw portion is formed on an outer circumferential surface of the setscrew 175D, and the setscrew 175D is screwed with a female screw formed on an inner circumferential surface of the housing cylinder 175A. The setscrew 175D abuts on an end portion on the other side (right side) of the spring 175B in the radial direction, thereby opposing biasing force of the spring 175B.

The armrest 160 has a first state and a second state. The first state is a state where the armrest 160 is used. The second state is a state where the armrest 160 is not used.

As depicted with a solid line in FIG. 15, in the first state of the armrest 160, a part of the ball 175C of the plunger 175 is inserted into the inside of the first cutout portion 173A. The plunger 175 engages with the movable cylinder 172 to restrict displacement of the movable cylinder 172 in the circumferential direction. This allows the armrest 160 to be suppressed from rattling even when vibration caused by the traveling of the combine harvester 1 is transmitted to the armrest 160.

Next, when the use of the armrest 160 is finished, for example, when the operator gets out the cockpit, the armrest 160 is shifted from the first state to the second state. Specifically, the operator grasps the mat portion 161 of the armrest 160, and pivots the armrest 160 upward in the circumferential direction around the pivot axis Ax1. At this time, the movable cylinder 172 applies external force toward the other side (right side) in the radial direction to the ball 175C inserted into the cutout portion 173 via the chamfer formed in the cutout portion 173.

This allows the ball 175C to be displaced toward the other side (right side) in the radial direction opposing biasing force from the spring 175B toward one side (left side) in the radial direction. When the ball 175C is completely released from the first cutout portions 173A, the movable cylinders 172 is disengaged from the plunger 175, and the armrest 160 pivots upward in the circumferential direction together with the movable cylinder 172 in response to the operation of the operator.

In a process in which the armrest 160 pivots upward in the circumferential direction, the position of the second cutout portion 173B coincides with that of the ball 175C of the plunger 175 in the circumferential direction. At this time, the ball 175C enters into the inside of the second cutout portion 173B by the biasing force from the spring 175B toward one side (left side) in the radial direction.

As depicted with a two-dot chain line in FIG. 15, this allows the plunger 175 to be engaged with the movable cylinder 172 with the armrest 160 being flipped upward in the circumferential direction, and thus the displacement of the movable cylinder 172 in the circumferential direction can be restricted. In this way, the position of the armrest 160 not in use is held. This state becomes the second state of the armrest 160.

That is, the movable range of the armrest 160 becomes a range between a position where the first cutout portion 173A faces the plunger 175 in the radial direction and a position where the second cutout portion 173B faces the plunger 175 in the radial direction.

Figure 17:
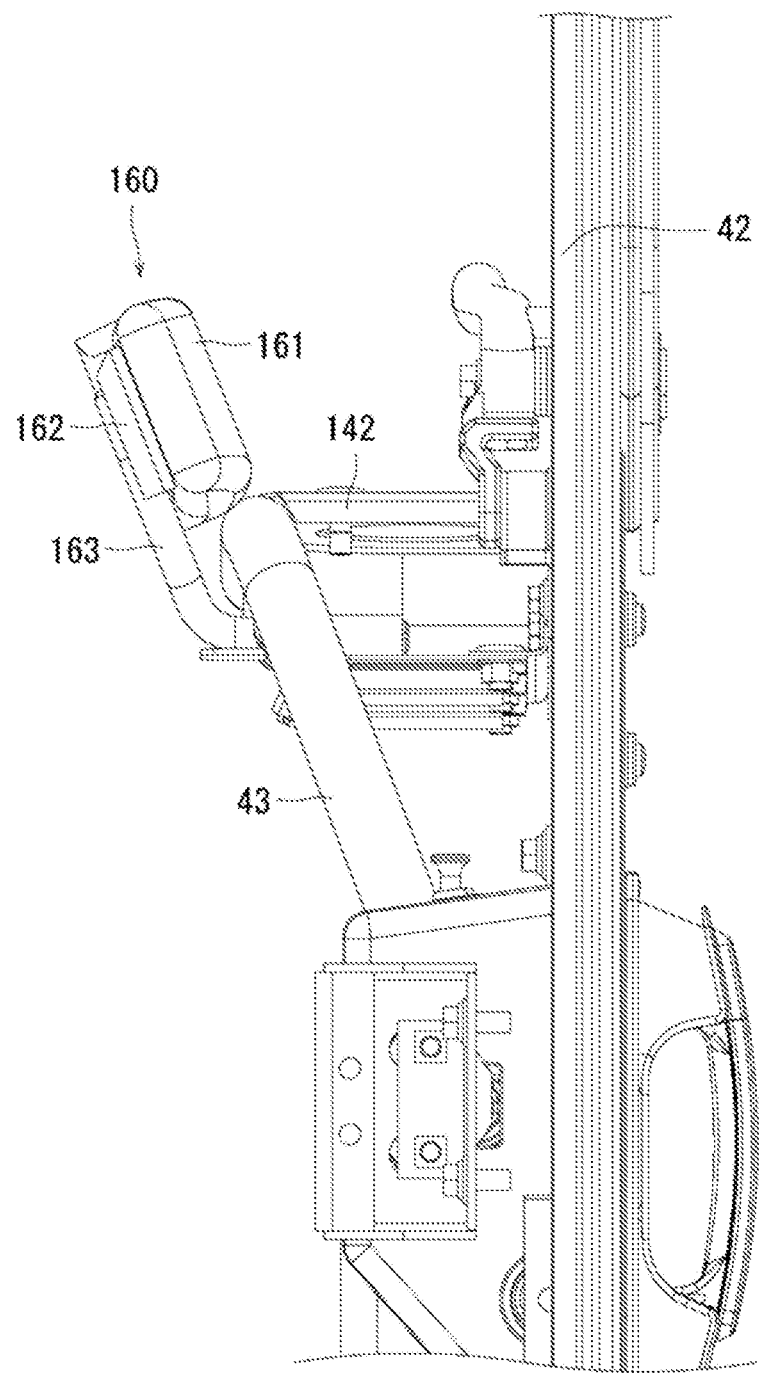
FIG. 17 is a rear view illustrating a second state of the armrest 160.

FIG. 17 is a rear view illustrating the second state of the armrest 160. As shown in FIG. 17, the armrest 160 not in use is held in a state where the mat portion 161 is positioned above the handle 43. In this way, the support member 170 supports the armrest 160 in a position-adjustable manner. Since the position of the armrest 160 is adjustable, for example, when the right door 42 is opened and closed or when the operator gets on and off the combine harvester 1, a protrusion amount of the armrest 160 to the inside (left side) of the cockpit can be reduced, and thus the convenience of the armrest 160 can be improved.

In addition, since the armrest 160 is supported by the support member 170 in a manner pivotable about the pivot axis Ax1, the operator can easily change the position of the armrest 160.

The support member 170 also has the retainer for retaining the armrest 160 at the ends of the movable range within which the armrest 160 pivots. This makes it possible to fix the position of the armrest 160 and suppress rattling of the armrest 160.

In addition, since the drink holder 142 is connected to the armrest 160, the convenience for the operator can be improved.

4. Other Modifications

Other examples of the first operation member of the present disclosure will be described. The first operation member corresponds to an operation switch corresponding to at least one of the following.

Operation switch frequently used during automatic steering (in particular, during straight traveling mode)

Operation switch provided on the steering wheel 18 or around the steering wheel 18

That is, the first operation can be defined as an operation individually performed by the operator in parallel with the automatic steering.

Examples of the operation switch frequently used during the automatic steering (in particular, during the straight traveling mode) include the following.

Operation switch for controlling inclination of the reaping unit 3 in the front-rear direction Operation switch for adjusting a front-rear and up-down movement of the rake-in reel 34

Examples of the operation switch provided on the steering wheel 18 or around the steering wheel 18 include the following.

Horn

Operation switch for various types of direction indicators such as a winker

In the combine harvester 1, upon a predetermined or more value of an operation load is applied to a steering wheel 18 during automatic steering, the automatic steering is released and switched to manual operation. Therefore, in the combine harvester 1, an operation switch, which is frequently used during automatic steering and provided on the steering wheel 18 or around the steering wheel 18, is provided separately from the steering wheel 18. This makes it possible for the driver to perform corresponding various types of operations without touching the steering wheel 18 by manipulating the first operation member provided separately from the steering wheel 18 during the automatic steering.

In this way, in the combine harvester 1 according to the present disclosure, the operation switches for performing the first operation are respectively provided at two positions which are a position on the steering wheel 18 and a position other than the steering wheel 18, such as in front of the armrest 140. Furthermore, during the automatic steering, the operation on each operation switches provided on the steering wheel 18 may be prioritized, or the operation on the first operation member provided on a position other than the steering wheel 18 may be prioritized.

Moreover, in place of the drink holder 142 of the present disclosure, a storage unit capable of storing articles other than drinks among the articles carried by the operator may be provided. The carried articles brought into the company by the operator include the following, for example.

Terminal device such as a smartphone

Personal items such as a wallet and a handkerchief

Luxury articles such as a cigarette and a portable ashtray carried during steering

5. Appendices

The present disclosure will be appended below.

Appendix 1

A work machine in which manual steering and automatic steering are switchable, the work machine including:

a manual steering device;

an automatic steering device that receives a switching operation and switches the manual steering to the automatic steering; and a first operation member that receives a first operation and causes a part of the work machine to be operated, wherein the first operation member is provided separately from the manual steering device.

Appendix 2

The work machine according to appendix 1, wherein the first operation member is disposed sideways of the automatic steering device.

Appendix 3

The work machine according to appendix 1 or 2 further including an armrest attached to the side on which the automatic steering device is disposed with respect to the manual steering device, wherein the first operation member is disposed between the automatic steering device and the armrest in a plan view.

Appendix 4

The work machine according to any one of appendices 1 to 3, wherein the first operation member is disposed at a position lower than a front end of the armrest.

Appendix 5

The work machine according to appendix 3 or 4, wherein the armrest is position-adjustable.

Appendix 6

The work machine according to any one of appendices 3 to 5 further including a handle attached to an inner side of a door, wherein the armrest is attached to the handle via a support member, and the support member supports the armrest in a position-adjustable manner.

Appendix 7

The work machine according to appendix 6, wherein the support member has a pivot axis extending in a front-rear direction, and the armrest is supported by the support member in a manner pivotable about the pivot axis.

Appendix 8

The work machine according to appendix 7, wherein the support member has a retainer that retains the armrest at ends of a movable range within which the armrest pivots.

Appendix 9

The work machine according to appendix 8, wherein the retainer has a detent mechanism that retains a position of the armrest in a circumferential direction about the pivot axis.

Appendix 10

The work machine according to any one of appendices 3 to 9, wherein a holder is connected to the armrest.

INDUSTRIAL APPLICABILITY

The present disclosure is applicable to a work machine that can switch between the manual steering and the automatic steering and perform various kinds of work.

REFERENCE SIGNS LIST

1 Combine harvester (work machine)
2 Traveling machine body
3 Reaping unit
4 Traveling unit
5 Crawler unit
6 Power unit
7 Threshing unit
8 Sorting unit
9 Grain storage unit
10 Grain tank
15 Cockpit
16 Cabin
17 Seat
18 Steering wheel (manual steering device)

21 Main shift lever
21a Reel back and forth/reel shift switch
21b Operation switch for horizontal control in reaping unit 3
21c Straight travel assist ON/OFF switch
21d Reaping lifting/lowering switch
21e No-clutch sub-shift switch
21f Auto-set switch
21g Auto-lift switch
21h Reaping clutch switch
22 Sub-shift lever
23 Work clutch lever
24 Side panel
25 Engine
30 Feeder
34 Rake-in reel
35 Feeder house
39 Cylinder for lifting/lowering
41 Right front pillar
42 Right door
43 Handle
100 Control device
111 Reel up/down operation switch
120 Switch box (automatic steering device)
121 Automatic start button
122 First route button
123 Second route button
124 Point A button
125 Point B button
131 Reel up/down switch (first operation member)
132 Route offset switch
135 Discharging auger operation remote controller
140 Armrest
141 Attachment member
142 Drink holder (holder)
150 Operation load sensor (detection unit)
160 Armrest
170 Support member
171 Connection cylinder
172 Movable cylinder (retainer)
173 Cutout portion
174 Fixed shaft
175 Plunger (retainer)
Ax1 Pivot axis
Ax2 Central axis

The invention claimed is:

1. A work machine in which manual steering and automatic steering are switchable, the work machine comprising:
a manual steering device;
an automatic steering device that is configured to:
receive a switching operation;
switch the manual steering to the automatic steering based on the switching operation; and
switch the automatic steering to the manual steering based on the manual steering device meeting a predetermined condition; and
a first operation member that is configured to:
receive a first operation; and
cause a part of the work machine to be operated based on the first operation, and
wherein the first operation member includes a first switch provided on the manual steering device and a second switch that is provided separately from the manual steering device and the automatic steering device.

2. The work machine according to claim 1, wherein the first operation member is disposed sideways of the automatic steering device.

3. The work machine according to claim 2, further comprising:
an armrest attached to a side on which the automatic steering device is disposed with respect to the manual steering device, and
wherein the first operation member is disposed between the automatic steering device and the armrest in a plan view.

4. The work machine according to claim 3, wherein the first operation member is disposed at a position lower than a front end of the armrest.

5. The work machine according to claim 3, wherein the armrest is position-adjustable.

6. The work machine according to claim 3, further comprising:
a handle attached to an inner side of a door, and
wherein:
the armrest is attached to the handle via a support member, and
the support member is configured to support the armrest in a position-adjustable manner.

7. The work machine according to claim 6, wherein:
the support member includes a pivot axis extending in a front-rear direction, and
the armrest is supported by the support member in a manner pivotable about the pivot axis.

8. The work machine according to claim 7, wherein the support member includes a retainer that is configured to retain the armrest at ends of a movable range within which the armrest is configured to pivot.

9. The work machine according to claim 8, wherein the retainer has a detent mechanism that is configured to retain a position of the armrest in a circumferential direction about the pivot axis.

10. The work machine according to claim 3, wherein a holder is connected to the armrest.

11. The work machine according to claim 1, wherein the predetermined condition includes a load applied to the manual steering device meeting a predetermined threshold.

12. The work machine according to claim 11, further comprising a sensor configured to detect the load applied to the manual steering device.

13. The work machine according to claim 1, further comprising a second operation member provided on the manual steering device, wherein the second operation member is configured to:
receive a second operation; and
cause the part of the work machine to be operated based on the second operation.

14. The work machine according to claim 1, wherein the predetermined condition is based on a preset steering angle of the manual steering device.

15. The work machine according to claim 1, further comprising an armrest,
wherein the first operation member is disposed between the automatic steering device and the armrest.

16. The work machine according to claim 15, wherein the armrest is pivotable.

17. The work machine according to claim 1, further comprising a cabin, wherein the first operation member is attached to a frame of the cabin.

18. The work machine according to claim 1, wherein each of the first switch and the second switch is configurable such that the part of the work machine that is operated based on the first operation can be changed.

* * * * *